United States Patent

Inoue

[11] Patent Number: 5,528,336
[45] Date of Patent: Jun. 18, 1996

[54] CAMERA

[75] Inventor: Nobuyuki Inoue, Kanagawa-ken, Japan

[73] Assignee: Canon Kabushiki Kaisha, Tokyo, Japan

[21] Appl. No.: 320,867

[22] Filed: Oct. 11, 1994

[30] Foreign Application Priority Data

Oct. 19, 1993 [JP] Japan .................................. 5-260924

[51] Int. Cl.⁶ .............................. G03B 7/00; G03B 19/12
[52] U.S. Cl. .......................................... 354/485; 354/152
[58] Field of Search .................................... 354/152, 288, 354/485; 361/756, 758

[56] References Cited

U.S. PATENT DOCUMENTS 4,238,151 12/1980 Yoshikawa ........................ 354/152
4,306,789 12/1981 Yamamoto ........................ 354/485
4,681,421 7/1987 Yamada et al. .................... 354/485
4,711,548 12/1987 Arakawa et al. .................. 354/485
4,974,014 11/1990 Teramoto et al. ................. 354/478

Primary Examiner—Michael L. Gellner
Assistant Examiner—Eddie C. Lee
Attorney, Agent, or Firm—Robin, Blecker, Daley and Driscoll

[57] ABSTRACT

A camera is provided with a viewfinder optical member of a roof shape, a flexible printed circuit board disposed along roof surfaces of the viewfinder optical member, and a member arranged to push the flexible printed circuit board toward the roof surfaces in such a way as to prevent the flexible printed circuit board from coming into contact with a top part of the viewfinder optical member.

7 Claims, 5 Drawing Sheets

CAMERA

BACKGROUND OF THE INVENTION

1. Field of the Invention

This invention relates to a camera having a viewfinder optical system.

2. Description of the Related Art

The number of cameras of the kind using a hollow roof mirror formed by combining mirrors for a viewfinder optical system in place of a roof prism made of glass has recently increased for reduction in cost and weight.

Cameras are generally arranged these days, on the other hand, to have an electronic circuit on a large scale. The electronic circuit is installed on a flexible printed circuit board. The flexible printed circuit board is laid by drawing it around in a complex shape in a narrow space available within the camera. In the case of the camera of the kind mentioned above, a space available between the roof surface of the hollow roof mirror and the upper cover of the camera is used in fitting the electronic circuit.

The hollow roof mirror is a very delicate high-precision part. Even a slight amount of external pressure onto the hollow roof mirror would deform the hollow roof mirror, thereby bringing about an adverse effect on an image appearing in the viewfinder. If the flexible printed circuit board is mounted directly on the hollow roof mirror, the roof surface of the hollow roof mirror would be pressed by the tension of the flexible printed circuit board, so that the hollow roof mirror would be warped. Under such a condition, the viewfinder image would be distorted by the warp of the hollow roof mirror. The flexible printed circuit board must be arranged not to push the hollow roof mirror.

FIG. 5 shows the installing structure of the conventional camera having a hollow roof mirror. Referring to FIG. 5, reference numeral 2 denotes a flexible printed circuit board. Electronic parts (not shown) which constitute an electronic circuit for the camera are installed on the flexible printed circuit board 2. The camera is provided with an upper cover 3 and a mirror box 4. The mirror box 4 supports a mirror (not shown) which is arranged to be movable between a position where a shot can be taken (hereinafter referred to as a shooting position) and another position where a sight of an image can be taken through the viewfinder (hereinafter referred to as a viewfinder image sighting position). A hollow roof mirror 1 which constitutes a viewfinder optical system is disposed in a predetermined position on the mirror box 4. The hollow roof mirror 1 has roof surfaces 1a and 1b of a roof shape. A protection cover 5 which is made of a metal plate is disposed above the roof surfaces 1a and 1b of the hollow roof mirror 1 to protect the hollow roof mirror 1 with an adequate clearance left between the protection cover 5 and the roof surfaces 1a and 1b. The flexible printed circuit board 2 is disposed above the protection cover 5. The flexible printed circuit board 2 is thus prevented from coming into direct contact with the hollow roof mirror 1, so that the hollow roof mirror 1 can be prevented from being deformed by the tension of the flexible printed circuit board 2.

The above-stated arrangement of the conventional camera, however, necessitates use of an additional dedicated part (i.e., the protection cover 5) of a size large enough to cover the whole roof surfaces 1a and 1b as to protect the hollow roof mirror 1. The use of this part causes an increase in cost.

Further, the protection cover 5 is arranged to leave a certain amount of clearance between the inner side of the protection cover 5 and the hollow roof mirror 1, the flexible printed circuit board 2 is installed above the protection cover 5, and the upper cover 3 of the camera is disposed above the flexible printed circuit board 2. This arrangement causes an increase in size of the camera and thus presents another shortcoming of the conventional camera.

SUMMARY OF THE INVENTION

One aspect of this invention lies in the provision of a camera which is of the kind having a flexible printed circuit board disposed above the surface of a viewfinder optical system having a roof surface and which is arranged to eliminate the shortcomings of the conventional camera described in the foregoing. To attain this aspect, the camera according to this invention is arranged to prevent the flexible printed circuit board from deforming the viewfinder optical system, by providing a member arranged to push the flexible printed circuit board toward the roof surface of the viewfinder optical system in such a way as to keep a portion of the flexible printed circuit board in a buoyed-up state over a top part of the roof surface.

The above and other aspect and features of this invention will become apparent from the following detailed description of embodiments thereof taken in connection with the accompanying drawings.

DETAILED DESCRIPTION OF THE PREFERRED EMBODIMENTS

Figure 1:
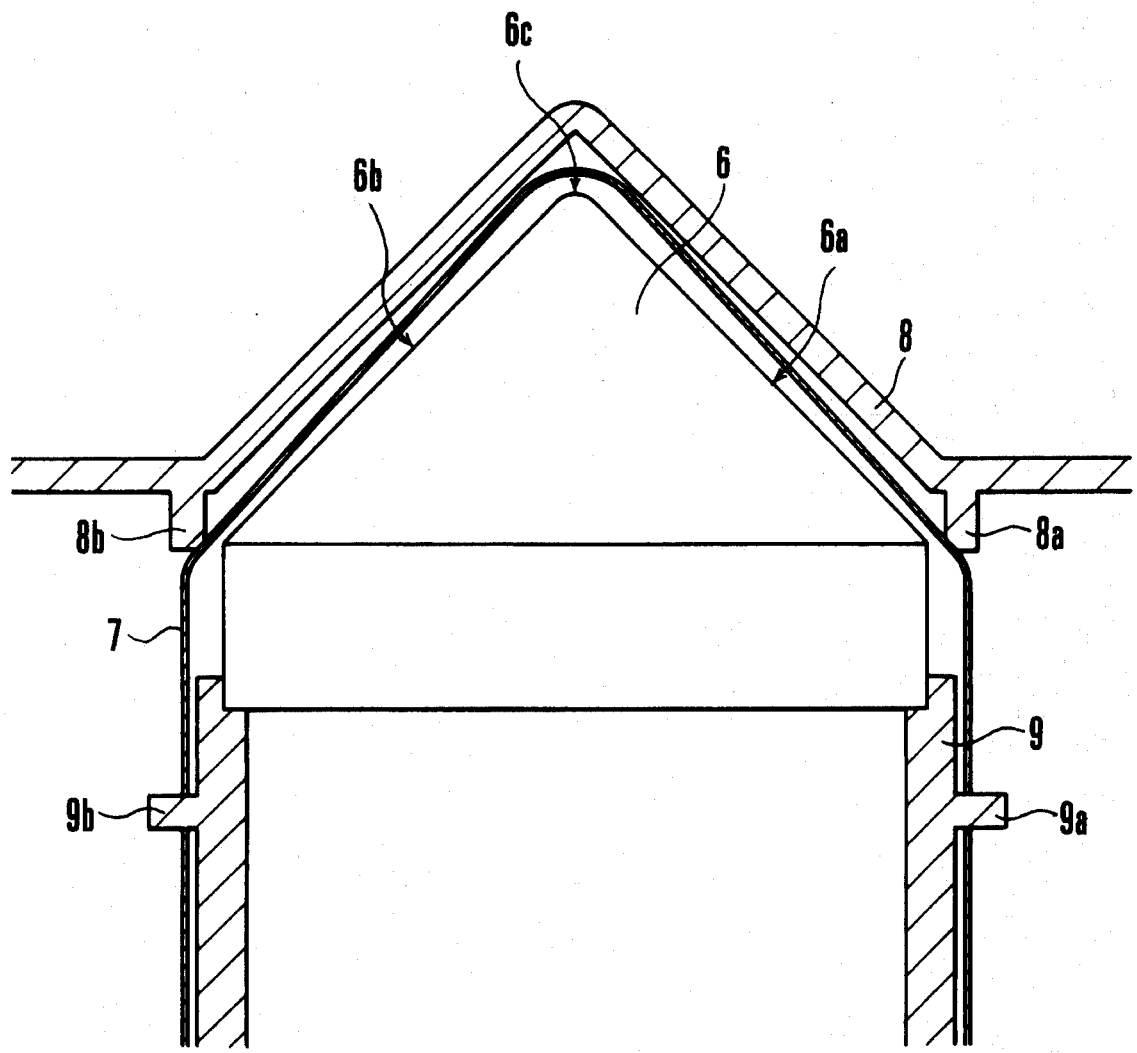
FIG. 1 is an enlarged front view showing the arrangement around a hollow roof mirror of a camera which is arranged as a first embodiment of this invention.

FIG. 1 shows the arrangement of a camera which is arranged as a first embodiment of this invention.

Referring to FIG. 1, a mirror box 9 is formed as a part of a camera body. The mirror box 9 supports a movable mirror (not shown) which is arranged to be movable between a shooting position and a viewfinder image sighting position. Positioning dowels 9a and 9b are provided on the side faces of the mirror box 9 for positioning a flexible printed circuit board 7. A hollow roof mirror 6 formed in a roof shape is set in a predetermined position on the mirror box 9 as an optical system of the viewfinder. An image of an object of shooting which is reflected by the movable mirror is corrected into an erect image by the hollow roof mirror 6, which is used in place of the conventional prism called a pentagonal prism. The hollow roof mirror 6 consists of roof surfaces 6a and 6b of a roof shape. The flexible printed circuit board 7 is disposed along the roof surfaces 6a and 6b. An upper cover 8 of the camera is provided with two projections 8a and 8b which are formed in positions corresponding to the two edge parts of the roof surfaces 6a and 6b of the hollow roof mirror 6.

Electronic parts (not shown) which constitute an electronic circuit of the camera are installed on the flexible printed circuit board 7. The flexible printed circuit board 7 is positioned by means of the positioning dowels 9a and 9b provided on the side faces of the mirror box 9 and is disposed along the roof surfaces 6a and 6b.

Figure 2:
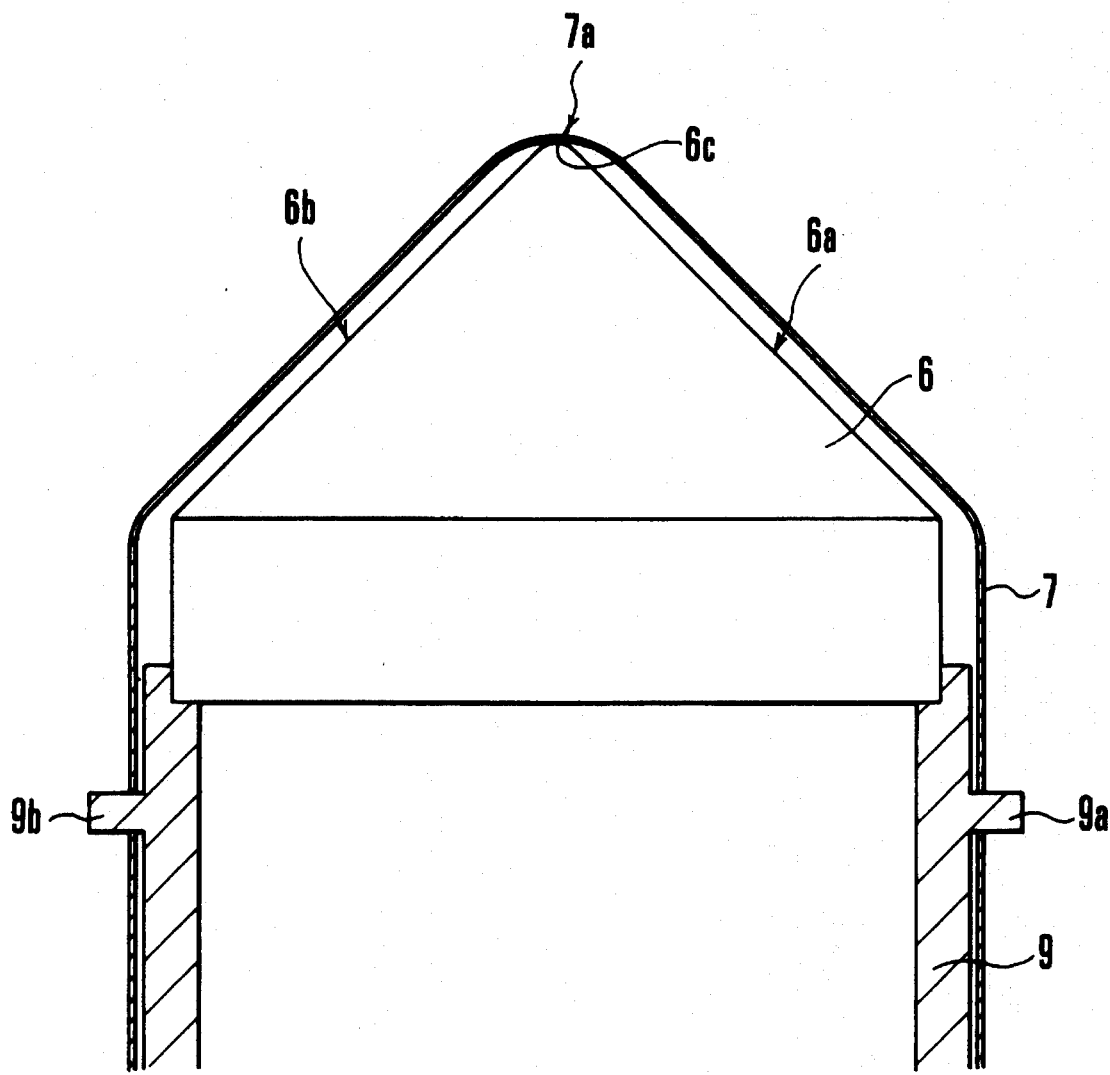
FIG. 2 shows a state of a flexible printed circuit board obtained before an upper cover is mounted on the camera shown in FIG. 1.

FIG. 2 shows the flexible printed circuit board 7 of the first embodiment of this invention in a state before the upper cover 8 is mounted. As shown in FIG. 2, before the upper cover 8 is mounted, a top part 7a of the flexible printed circuit board 7 is pushing a top part 6c of the hollow roof mirror 6, because the tension of the flexible printed circuit board 7 urges the flexible printed circuit board 7 to straighten out.

With the upper cover 8 mounted as shown in FIG. 1, the projections 8a and 8b of the upper cover 8 respectively push the portions of the flexible printed circuit board 7 corresponding to the outside edge parts of the roof surfaces 6a and 6b of the hollow roof mirror 6. Then, since the position of the flexible printed circuit board 7 is restricted by the positioning dowels 9a and 9b of the mirror box 9, the pushing force of the projections 8a and 8b causes the flexible printed circuit board 7 to be pulled toward the top part 6c of the hollow roof mirror 6, to be buoyed up away from the top part 6c and to be pulled near the upper cover 8. As a result, the hollow roof mirror 6 is no longer pushed by the flexible printed circuit board 7.

Figure 3:
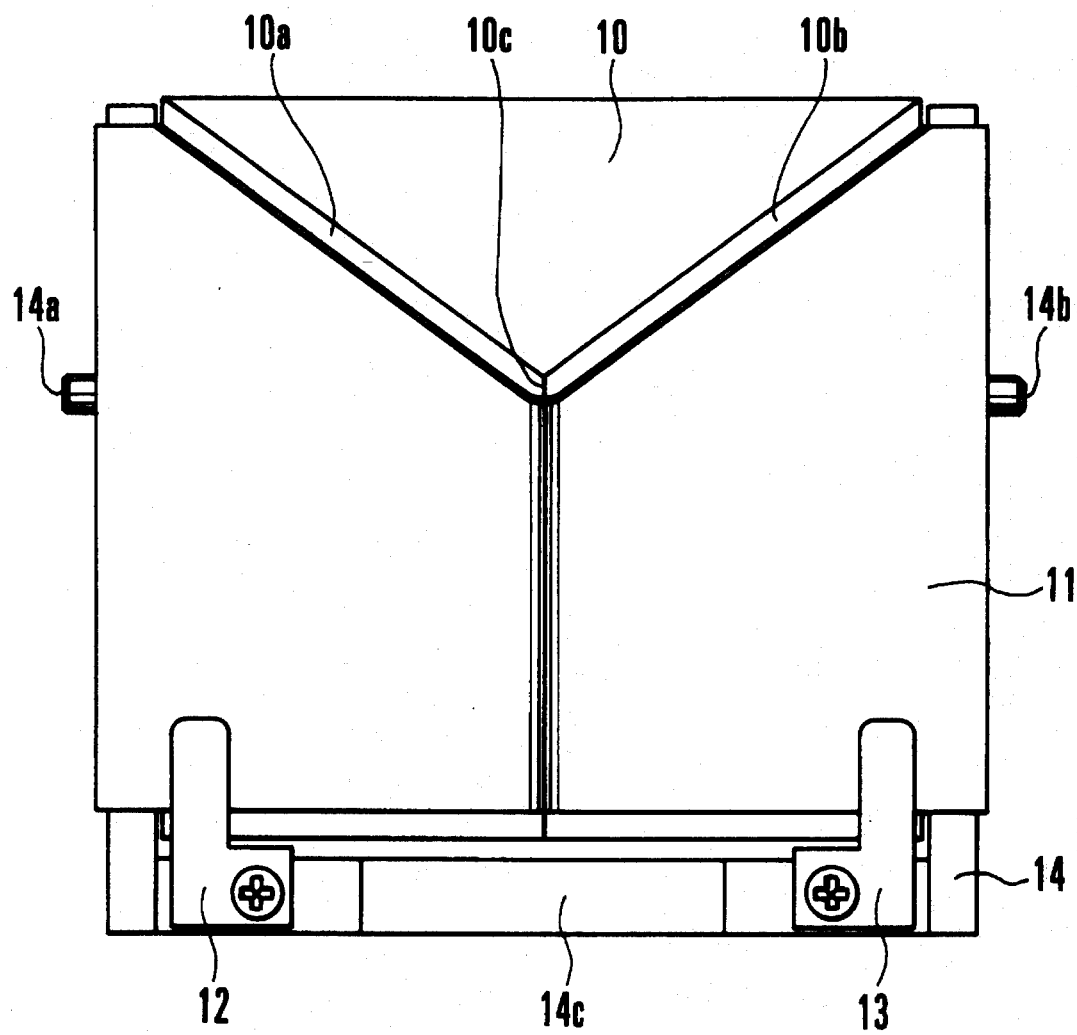
FIG. 3 is a top view showing the arrangement around a hollow roof mirror of a camera which is arranged as a second embodiment of this invention.
Figure 4:
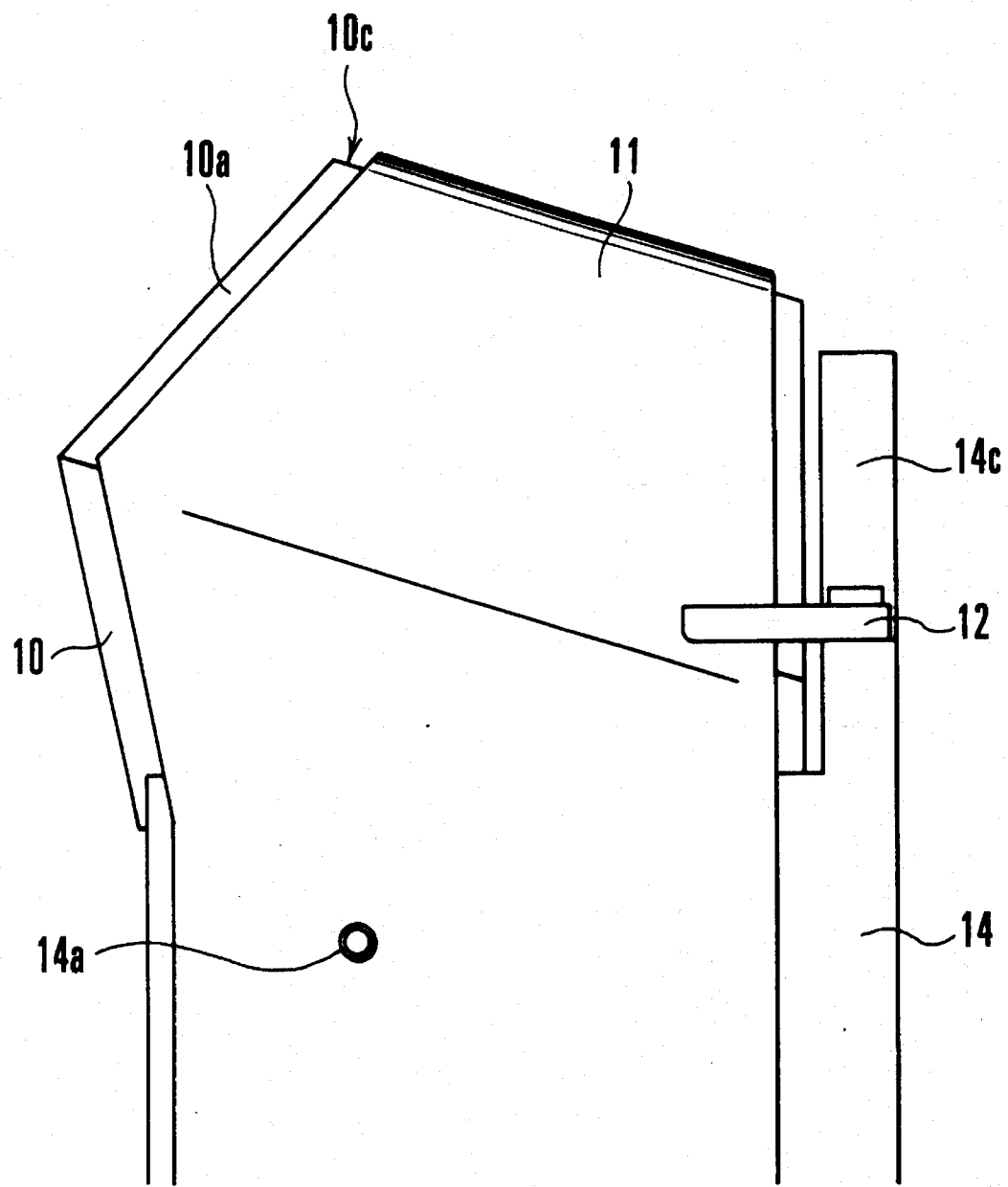
FIG. 4 is a side view showing the structural parts of the camera shown in FIG. 3.
Figure 5:
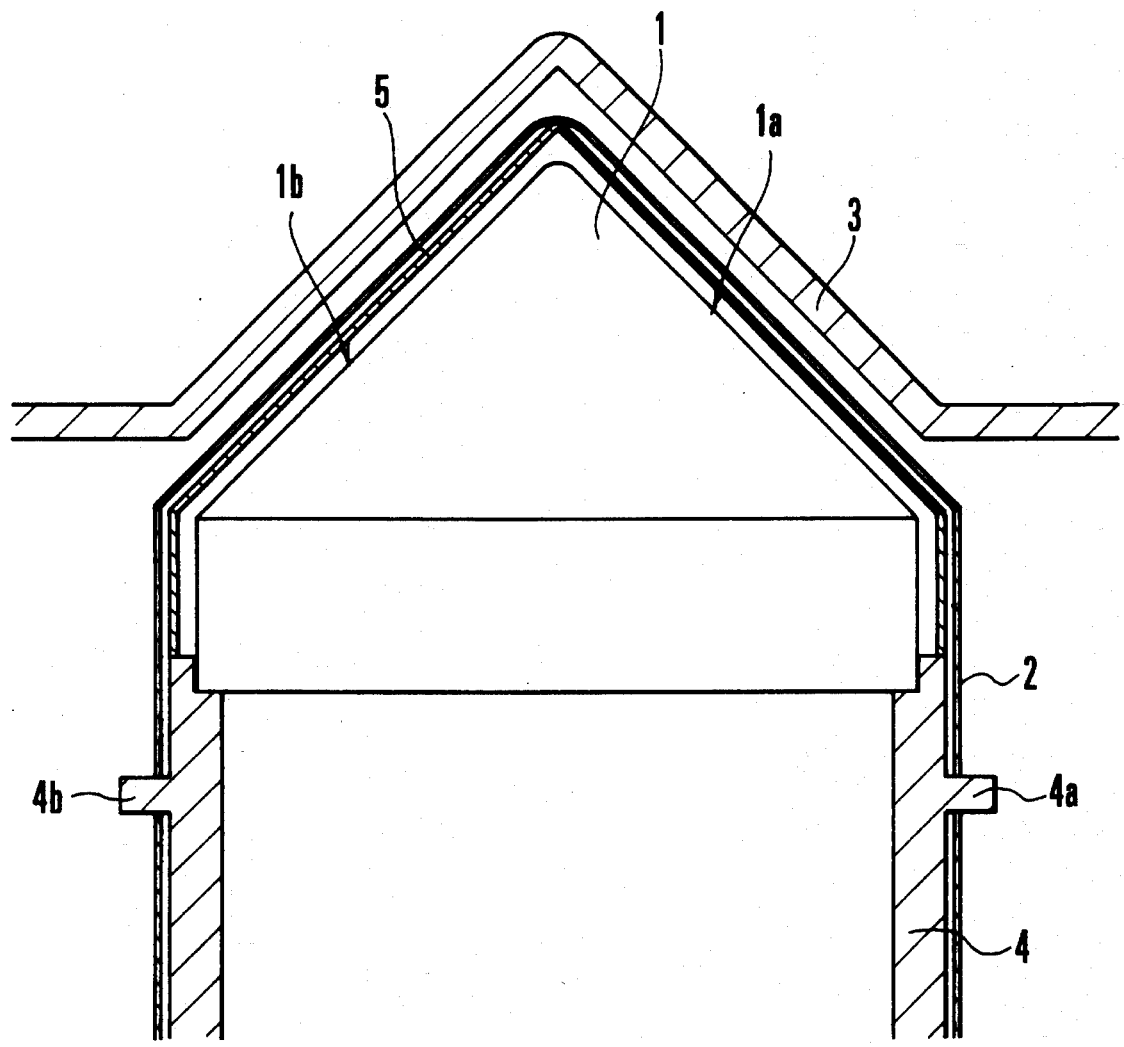
FIG. 5 is a front view showing the arrangement of a flexible printed circuit board over a hollow roof mirror included in the conventional camera.

FIGS. 3 and 4 show a second embodiment of this invention, FIG. 3 being a top view and FIG. 4 being a side view.

Referring to FIGS. 3 and 4, a mirror box 14 supports a movable mirror (not shown) which is movable between a shooting position and a viewfinder image sighting position. Positioning dowels 14a and 14b are provided on the side faces of the mirror box 14 for positioning a flexible printed circuit board 11. An eyepiece frame 14c which holds an eyepiece lens (not shown) is formed in rear of the mirror box 14 integrally with the mirror box 14. A hollow roof mirror 10 is disposed in a predetermined position on the mirror box 14 as a viewfinder optical system. The hollow roof mirror 10 consists of roof surfaces 10a and 10b of a roof shape. The flexible printed circuit board 11 is disposed above the roof surfaces 10a and 10b. With the dowels 14a and 4b on the side faces of the mirror box 14 used for positioning, the flexible printed circuit board 11 is installed along the roof surfaces 10a and 10b of the hollow roof mirror 10.

Flexible-printed-circuit-board pressing members 12 and 13 are mounted on both sides of the eyepiece frame 14c to push the portions of the flexible printed circuit board 11 corresponding to the outside edge parts of the roof surfaces 10a and 10b of the hollow roof mirror 10. As shown in FIG. 4, the hollow roof mirror 10 is in a shape having a lower height on its rear side. If the flexible printed circuit board 11 is naturally placed along the hollow roof mirror 10, therefore, a clearance between the flexible printed circuit board 11 and the two edge parts of the roof surfaces 10a and 10b of the hollow roof mirror 10 would be larger in the rear part of the hollow roof mirror 10. Therefore, in the case of the second embodiment, the effect of the invented arrangement is more advantageously attained by pressing the flexible printed circuit board 11 by means of the flexible-printed-circuit-board pressing members 12 and 13 on its rear side which is located closer to the eyepiece on the rear side of an optical axis. Since the position of the flexible printed circuit board 11 is restricted by means of the positioning dowels 14a and 14b of the mirror box 14, the flexible printed circuit board 11 which is pressed by the flexible-printed-circuit-board pressing members 12 and 13 is pulled toward the top part 10c of the hollow roof mirror 10, is buoyed up away from the top part 10c and is pulled near the upper cover (not shown). Therefore, the arrangement eliminates the possibility of having the hollow roof mirror 10 pushed by the flexible printed circuit board 11.

In the case of the second embodiment, the flexible-printed-circuit-board pressing members 12 and 13 are provided on one side of the mirror box 14 where the hollow roof mirror 10 is mounted. Therefore, the pressing members 12 and 13 can be arranged to precisely push the most apposite parts of the flexible printed circuit board 11 by an optimum amount.

The arrangement of each of the embodiments described above enables the flexible printed circuit board to be disposed directly above the hollow roof mirror without necessitating provision of a protection cover between the hollow roof mirror and the flexible printed circuit board. Therefore, the invented arrangement permits reduction in size and cost of the camera.

What is claimed is:

1. A camera comprising:

a viewfinder optical member having a roof shape;

a flexible printed circuit board disposed along roof surfaces of said viewfinder optical member; and a specific member arranged to push said flexible printed circuit board toward said roof surfaces in such a way as to prevent said flexible printed circuit board from coming into contact with a top part of said roof surfaces, said specific member being formed to protrude from an upper cover which covers said viewfinder optical member.

2. A camera according to claim 1, wherein a hollow roof mirror is employed as said viewfinder optical member.

3. A camera according to claim 1, further comprising a positioning member arranged to position said flexible printed circuit board, said positioning member being disposed in a position lower than said specific member, with the top part of said roof surfaces of said viewfinder optical member being located in a higher position.

4. A camera according to claim 2, further comprising a positioning member arranged to position said flexible printed circuit board, said positioning member being disposed in a position lower than said specific member, with the top part of said roof surfaces of said viewfinder optical member being located in a higher position.

5. A camera according to claim 1, wherein said specific member is arranged to push said flexible printed circuit board toward said roof surfaces in a rear position of said viewfinder optical member.

6. A camera according to claim 3, wherein said specific member is arranged to push said flexible printed circuit board toward said roof surfaces in a rear position of said viewfinder optical member.

7. A camera according to claim 4, wherein said specific member is arranged to push said flexible printed circuit board toward said roof surfaces in a rear position of said viewfinder optical member.

* * * * *